United States Patent
Wang et al.

(10) Patent No.: US 12,093,917 B2
(45) Date of Patent: Sep. 17, 2024

(54) SYSTEM AND APPLICATION SERVER FOR SECURE GUEST CHECKOUT

(71) Applicant: MASTERCARD ASIA/PACIFIC PTE. LTD, Singapore (SG)

(72) Inventors: Zunhua Wang, Singapore (SG); Teck Yong Tan, Singapore (SG); Rasika Chandana Karunapala, Sri Lanka (LK); Deepa Swami, Maharashtra (IN)

(73) Assignee: MASTERCARD ASIA/PACIFIC PTE. LTD, Singapore (SG)

(*) Notice: Subject to any disclaimer, the term of this patent is extended or adjusted under 35 U.S.C. 154(b) by 788 days.

(21) Appl. No.: 17/005,771

(22) Filed: Aug. 28, 2020

(65) Prior Publication Data
US 2021/0065153 A1 Mar. 4, 2021

(30) Foreign Application Priority Data
Aug. 29, 2019 (SG) .............................. 10201907963T

(51) Int. Cl.
*G06Q 30/0601* (2023.01)
*G06Q 20/12* (2012.01)
*G06Q 20/32* (2012.01)
*G06Q 30/018* (2023.01)

(52) U.S. Cl.
CPC ......... *G06Q 20/3223* (2013.01); *G06Q 20/12* (2013.01); *G06Q 30/0185* (2013.01); *G06Q 30/0633* (2013.01); *G06Q 2220/00* (2013.01)

(58) Field of Classification Search
CPC .............. G06Q 20/3223; G06Q 20/12; G06Q 30/0185; G06Q 30/0633; G06Q 2220/00

USPC .......................................................... 705/73
See application file for complete search history.

(56) References Cited

U.S. PATENT DOCUMENTS

| | | | |
|---|---|---|---|
| 10,524,110 B1* | 12/2019 | Klem | H04L 63/18 |
| 2011/0246363 A1* | 10/2011 | Stone | G06Q 20/02 |
| | | | 705/44 |
| 2011/0270751 A1* | 11/2011 | Csinger | G06F 21/40 |
| | | | 705/42 |
| 2012/0158528 A1* | 6/2012 | Hsu | G06Q 20/322 |
| | | | 705/16 |

(Continued)

*Primary Examiner* — Patrick McAtee
*Assistant Examiner* — Zesheng Xiao
(74) *Attorney, Agent, or Firm* — Buckley, Maschoff & Talwalkar LLC

(57) ABSTRACT

A system for initiating secure guest checkout includes an application server; and an untrusted user interaction device that is in communication with the application server. The untrusted user interaction device has a unique device identifier that is registered with the application server. The untrusted user interaction device is configured to: receive input data relating to a selection of one or more items; transmit, to the application server, the selection of one or more items and the unique device identifier, for creation of a cart at the application server; communicate a pairing code received from the application server, the pairing code being associated with the cart; and wirelessly broadcast identifier data including, and/or derived from, the unique device identifier; such that a computing device that receives the identifier data and the pairing code can verify the unique device identifier and retrieve the cart from the application server for initiation of a secure remote commerce (SRC) checkout process at an SRC initiator.

13 Claims, 7 Drawing Sheets

(56) References Cited

U.S. PATENT DOCUMENTS

| | | | |
|---|---|---|---|
| 2014/0133656 A1* | 5/2014 | Wurster | H04W 4/023 |
| | | | 380/270 |
| 2014/0143137 A1* | 5/2014 | Carlson | G06Q 20/18 |
| | | | 705/39 |
| 2015/0127529 A1* | 5/2015 | Makhotin | G06Q 20/322 |
| | | | 705/39 |
| 2015/0334108 A1* | 11/2015 | Khalil | H04L 63/0815 |
| | | | 726/8 |

* cited by examiner

SYSTEM AND APPLICATION SERVER FOR SECURE GUEST CHECKOUT

CROSS-REFERENCE

The present invention is a non-provisional application claiming priority to Singapore Patent Application No. 10201907963T which was filed on Aug. 29, 2019, incorporated by reference herein in its entirety.

TECHNICAL FIELD

The present disclosure relates to a system and an application server for secure guest checkout.

BACKGROUND

Access requests, such as requests for access to secured physical or digital environments, are commonly made using digital credentials. For example, transit systems or other physical environments may have physical barriers that can be opened via the transmission and validation of authentication credentials received from a smart card, or from a mobile computing device that emulates a smart card, by a communications interface such as a near-field communications (NFC) interface. NFC interfaces are also used to provide authentication credentials to computer systems to enable users to effect payment or non-payment transactions.

In another kind of access request, the authentication credentials may be transmitted to a remotely located access control server by a computing device of the user. This may be required, for example, when the user wishes to make a "card not present" (CNP) payment transaction with an online merchant. In a CNP transaction, the user typically enters a first set of authentication credentials that include a primary account number (PAN) of a payment device, an expiry date, and a card verification value (CVV). These credentials are transmitted for verification to an access control server operated by or on behalf of an issuer of the payment device. In some instances, the user may create a profile with the online merchant, in which the above payment information is stored. To complete a transaction, the user enters a second, different, set of authentication credentials in the form of login credentials that enable them to access their profile, and thus the first set of credentials, to cause the first set of credentials to be transmitted to the access control server of the issuer.

Several difficulties may occur in relation to online transaction environments. In particular, such environments are not currently standardised, such that there is a large amount of variation in implementation, leading to complexity and inconsistency. Further, remote payments are being increasingly targeted by bad actors, and are susceptible to compromise. In addition, users are often required to enter payment data and related checkout data in many places, leading to further risk of data compromise and fraud.

Partly as a result of these difficulties, there has recently been a proposal to standardise online transaction environments, called Secure Remote Commerce (SRC). SRC is a payment platform, including a technical framework and specifications, that enables the secure exchange of data for payment transactions. SRC connects customers, merchants, issuers, acquirers, and other entities and enables a merchant to obtain a payload of customer payment information that can be used for payment transaction authorization.

It is increasingly common for users to interact with digital merchants by means such as smart speakers and other devices that employ a voice user interface (VUI). Such devices may prompt (via a voice assistant) a user to request items for purchase, add the items to a cart in response to user voice input, and enable, or at least prompt, checkout by the user. For example, to perform checkout, the user needs to have an account with the digital merchant (which has one or more payment vehicles for the user on file), and the VUI device needs to establish a link with the user's account prior to checkout.

Currently, manufacturers of VUI devices such as smart speakers do not always enable access to the device such that a device identifier can be determined. Additionally, each app or service on the VUI device may be assigned a different value, even though it executes on the same device as the others.

The SRC framework requires that any device being used for checkout be consistently identified so as to establish a trusted relationship for secure checkout. Accordingly, current VUI devices are not configured for secure guest checkout.

It would be desirable to overcome or alleviate at least one of the above-described problems, or at least to provide a useful alternative.

SUMMARY

Disclosed herein is a system for initiating secure guest checkout, including:
an application server; and
an untrusted user interaction device that is in communication with the application server;
wherein the untrusted user interaction device has a unique device identifier that is registered with the application server, and is configured to:
receive input data relating to a selection of one or more items;
transmit, to the application server, the selection of one or more items and the unique device identifier, for creation of a cart at the application server;
communicate a pairing code received from the application server, the pairing code being associated with the cart; and
wirelessly broadcast identifier data including, and/or derived from, the unique device identifier;
such that a computing device that receives the identifier data and the pairing code can verify the unique device identifier and retrieve the cart from the application server for initiation of a secure remote commerce (SRC) checkout process at an SRC initiator.

In certain embodiments, the identifier data includes an encrypted form of the unique device identifier.

The identifier data may include a URL that embeds the unique device identifier, such that the computing device can verify the unique device identifier by accessing the URL with a browser application.

In certain embodiments, the untrusted user interaction device is a smart speaker, a digital kiosk or a self-service terminal.

The untrusted user interaction device may be configured to broadcast the identifier data by Bluetooth Low Energy (BLE).

The untrusted user interaction device may include, or be in communication with, a beacon device that is configured to broadcast the identifier data. The beacon device may be connected to a physical or logical port of the user interaction device, for example.

Also disclosed herein is an application server for initiating secure guest checkout, including:
- at least one processor; and
- non-volatile computer-readable storage in communication with the at least one processor and having stored thereon instructions for causing the at least one processor to:
- receive, from an untrusted user interaction device, a request to generate or add items to a shopping cart of a user of a computing device;
- generate a pairing code associated with the shopping cart;
- transmit, to the untrusted user interaction device, the pairing code;
- receive, from the computing device, a request to verify a unique device identifier of the untrusted user interaction device;
- verify that the unique device identifier is registered with the application server;
- responsive to successful verification of the unique device identifier, transmit, to the computing device, a request to enter the pairing code; and
- responsive to a determination that a received pairing code matches the pairing code, transmit, to the computing device, details of the shopping cart for initiation by the computing device of a secure remote commerce (SRC) checkout process at an SRC initiator.

The identifier data may include an encrypted form of the unique device identifier.

In some embodiments, the identifier data includes a URL that embeds the unique device identifier, and wherein verification of the unique device identifier includes serving a web page retrievable via said URL.

The untrusted user interaction device may be a smart speaker, a digital kiosk or a self-service terminal.

Further disclosed herein is an untrusted user interaction device for secure guest checkout, the untrusted user interaction device being in communication with an application server and having a unique device identifier that is registered with the application server, the untrusted user interaction device including:
- at least one processor;
- non-volatile computer readable storage in communication with the at least one processor; and
- a beacon device in communication with the at least one processor;
- wherein the non-volatile computer readable storage has stored thereon instructions for causing the at least one processor to:
- receive input data relating to a selection of one or more items;
- transmit, to the application server, the selection of one or more items and the unique device identifier, for creation of a cart at the application server;
- communicate a pairing code received from the application server, the pairing code being associated with the cart; and
- transmit, to the beacon device, an instruction to wirelessly broadcast identifier data including, and/or derived from, the unique device identifier;
- such that a computing device that receives the identifier data and the pairing code can verify the unique device identifier and retrieve the cart from the application server for initiation of a secure remote commerce (SRC) checkout process at an SRC initiator.

The identifier data may include an encrypted form of the unique device identifier.

In some embodiments, the identifier data includes a URL that embeds the unique device identifier, such that the computing device can verify the unique device identifier by accessing the URL with a browser application.

The untrusted user interaction device may be a smart speaker, a digital kiosk or a self-service terminal.

The beacon device may be configured to broadcast the identifier data by Bluetooth Low Energy (BLE).

Further disclosed herein is one or more non-volatile computer-readable media having stored thereon computer-readable instructions for causing at least one processor to:
- receive, from a user, input data relating to a selection of one or more items;
- transmit, to the application server, the selection of one or more items and the unique device identifier, for creation of a cart at the application server;
- communicate a pairing code received from the application server, the pairing code being associated with the cart; and
- wirelessly broadcast identifier data including, and/or derived from, the unique device identifier;
- such that a computing device that receives the identifier data and the pairing code can verify the unique device identifier and retrieve the cart from the application server for initiation of a secure remote commerce (SRC) checkout process at an SRC initiator.

BRIEF DESCRIPTION OF THE DRAWINGS

Embodiments of the present invention will now be described, by way of non-limiting example, with reference to the drawings in which.

DETAILED DESCRIPTION

Embodiments relate to a system for initiating secure guest checkout, including:
- an application server; and
- an untrusted user interaction device that is in communication with the application server;
- wherein the untrusted user interaction device has a unique device identifier that is registered with the application server, and is configured to:
- receive, from a user, input data relating to a selection of one or more items;
- transmit, to the application server, the selection of one or more items and the unique device identifier, for creation of a cart at the application server;
- communicate a pairing code received from the application server, the pairing code being associated with the cart; and
- wirelessly broadcast identifier data including, and/or derived from, the unique device identifier;

such that a computing device that receives the identifier data and the pairing code can verify the unique device identifier and retrieve the cart from the application server for initiation of a secure remote commerce (SRC) checkout process at an SRC initiator.

Advantageously, the use of a pairing code generated by the DSA server, combined with verification of the user interaction device at the DSA server, enables secure guest checkout in an SRC framework.

Figure 1:
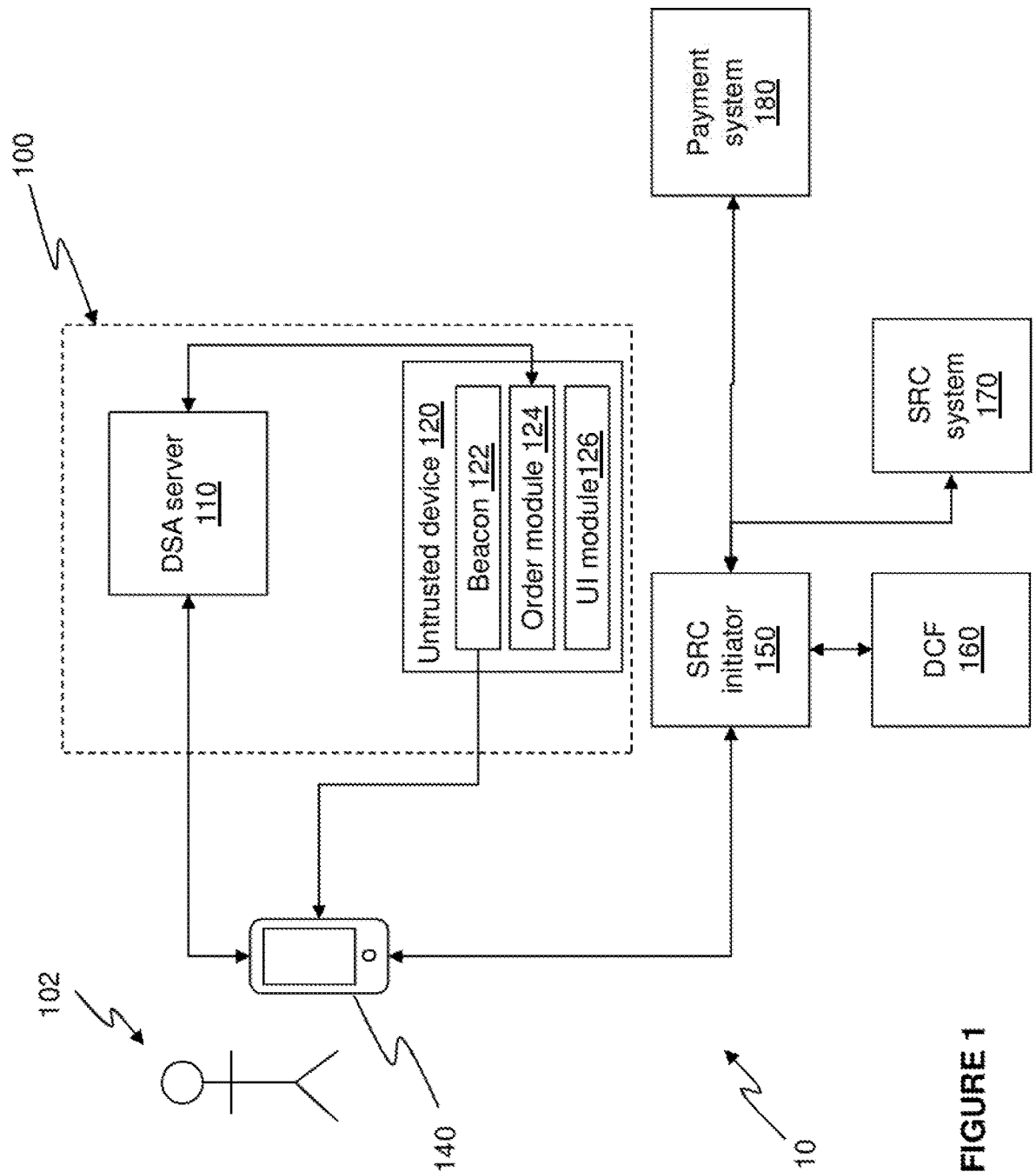
FIG. 1 is a system architecture diagram of an example transaction processing system, including a system for initiating a secure guest checkout.

Referring to FIG. 1, a system 100 for processing checkout requests may be part of a transaction processing system 10. The transaction processing system 10 provides functionality that enables a user 102 with a computing device, such as a mobile device 140, to order, and electronically pay for, items without presenting a payment device at a physical point of sale.

In particular, the system 100 for processing checkout requests enables initiation of secure checkout in a secure remote commerce (SRC) framework. Details of exemplary SRC transaction flows and data formats may be found in the following documents:

(1) EMV Secure Remote Commerce Technical Framework (version 1.0, October 2017); and
(2) EMV Secure Remote Commerce Specification (version 0.9 DRAFT, October 2018).

Each of documents (1) and (2) is available from www.emvco.com, and the disclosure of each is hereby incorporated by reference in its entirety as if fully set forth herein.

Processes performed by checkout system 100 and computing device 140 cause an SRC initiator 150 to trigger the generation of SRC payload data by digital card facilitator (DCF) 160 and/or SRC system 170. The SRC payload data is used by the SRC initiator 150 to initiate an authorisation request at payment system 180. The payment system 180 may include one or more of an acquirer, a payment network such as Mastercard, and an issuer, for example. In some embodiments, the SRC system 170 may be the payment network. The authorisation request includes payment information, including details of a card selected by the user 102 via computing device 140. A successful authorisation results in the selected card being charged for purchase of one or more items selected by the user 102.

The checkout system 100 includes an application server 110. In the SRC framework, the application server 110 may be a digital shopping application (DSA) server. Application server 110 may be operated by a merchant or other service provider and is responsible for receiving user requests for items, storing those requests, and enabling users 102 to securely checkout and pay for the requested items in a manner which will be described below.

Checkout system 100 includes a user interaction device 120 that is in communication with the application server 110. The user interaction device 120 may be an untrusted device, such as a smart speaker, kiosk, or other device that does not provide a mechanism for a user to securely validate their credentials to the application server 110, and/or which does not securely store data relating to the user or to selections made by the user.

The user interaction device 120 includes, or is paired with, a beacon device 122 that is configured to wirelessly broadcast data, including identifier data that includes, and/or is derived from, a unique device identifier of the untrusted device 120. The unique device identifier is registered with the application server 110 and is used to identify untrusted device 120 to the application server 110. For example, the unique device identifier may be a universally unique identifier (UUID) or globally unique identifier (GUID) retrievable from storage of the untrusted device 120 using an API call made by the application server 110. Alternatively, the unique device identifier may be a combination of a manufacturer identifier (provided by the untrusted device 120 or assigned by the application server 110) and a UUID or GUID retrieved from storage of the untrusted device 120 using an API call made by the application server 110. In other embodiments, the application server 110 may generate a unique device identifier as part of enrolment of the device 120 with the application server 110, and transmit the generated unique device identifier to the device 120 for persistent storage and later use.

The beacon device 122 may be integral with the user interaction device 120, in that it may be permanently contained in a housing of the user interaction device 120. Alternatively, it may be attached (e.g., via a USB port or other physical connection) to the user interaction device 120, or may be wirelessly paired with the user interaction device 120, for example via Bluetooth or another wireless communication protocol. For example, Bluetooth Low Energy (BLE) beacons such as those sold by Accent Advanced Systems, SLU (Barcelona) under the trade mark IBKS may be suitable for use with the untrusted device 120.

Untrusted device 120 also includes a user interface (UI) module 126 that enables user 102 to interact with the untrusted device 120 to input data, and to obtain data from the untrusted device 120. For example, the UI module 126 may be a voice user interface (VUI), such as a voice assistant (e.g., Alexa of Amazon, Inc. or Google Assistant of Google, Inc.), that receives voice input from the user 102, and interprets the voice input to perform actions such as communicating items selected by the user 102 to application server 110, as will be described below. The UI module 126 also provides output, such as feedback to the user 102 on a total price of the selected items, a pairing code to be used by the user 102 for SRC checkout, or a prompt to commence a checkout process in a digital shopping application (DSA).

In some embodiments, the UI module 126 may alternatively, or also, include a graphical user interface component to enable display of information to user 102, and/or input by user 102, for example via a touch screen display or other user input device of the untrusted device 120.

Untrusted device 120 further includes an order module 124. The order module 124 receives input from the UI module 126 regarding the items selected by user 102, and communicates the selection to application server 110. Order module 124 also receives, from application server 110, a pairing code that is associated with a shopping cart at the application server 110, and sends this to UI module 126 for communication to the user 102.

Figure 2:
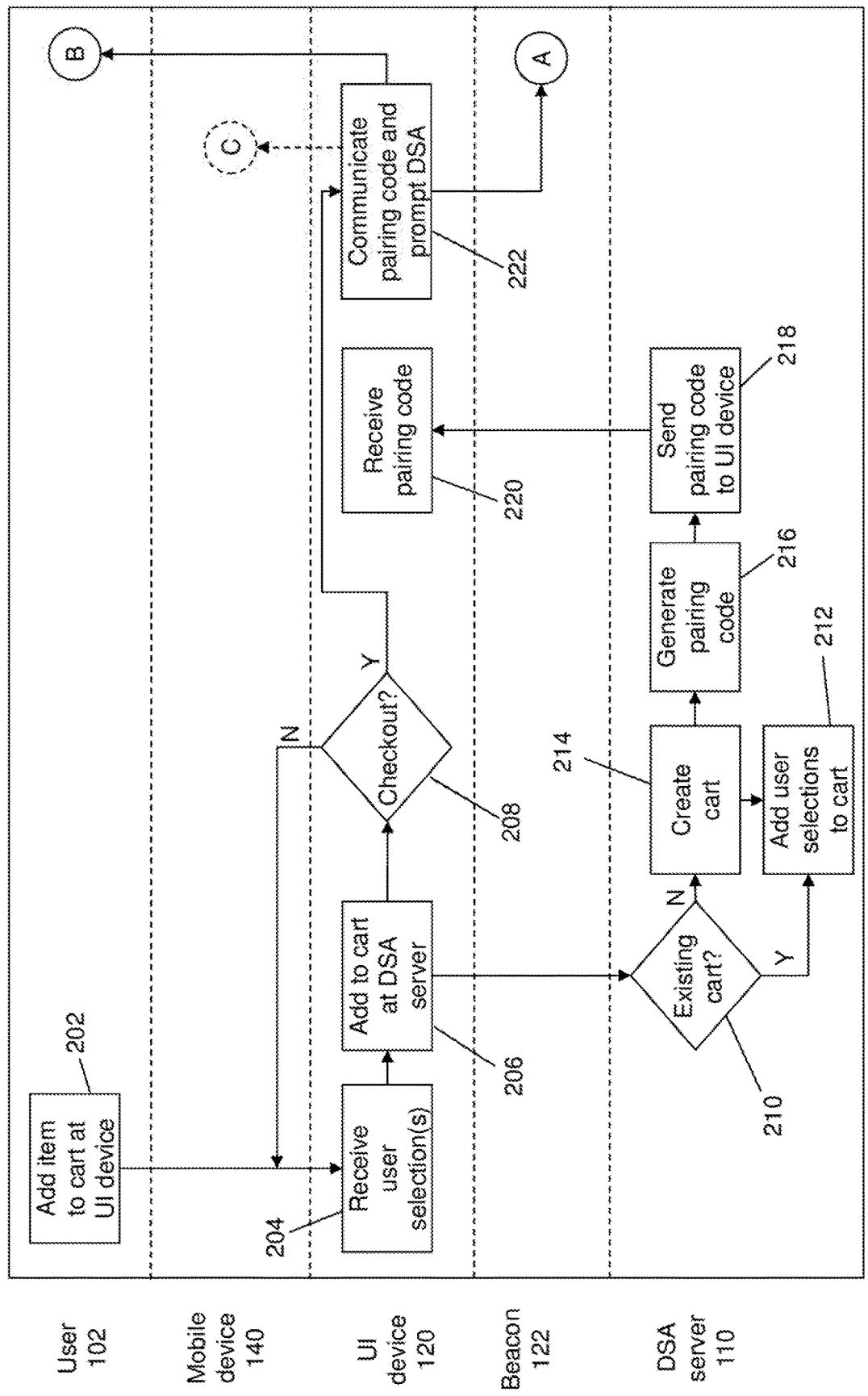
FIG. 2 is a flow diagram showing steps in an example secure checkout initiation process.
Figure 2:
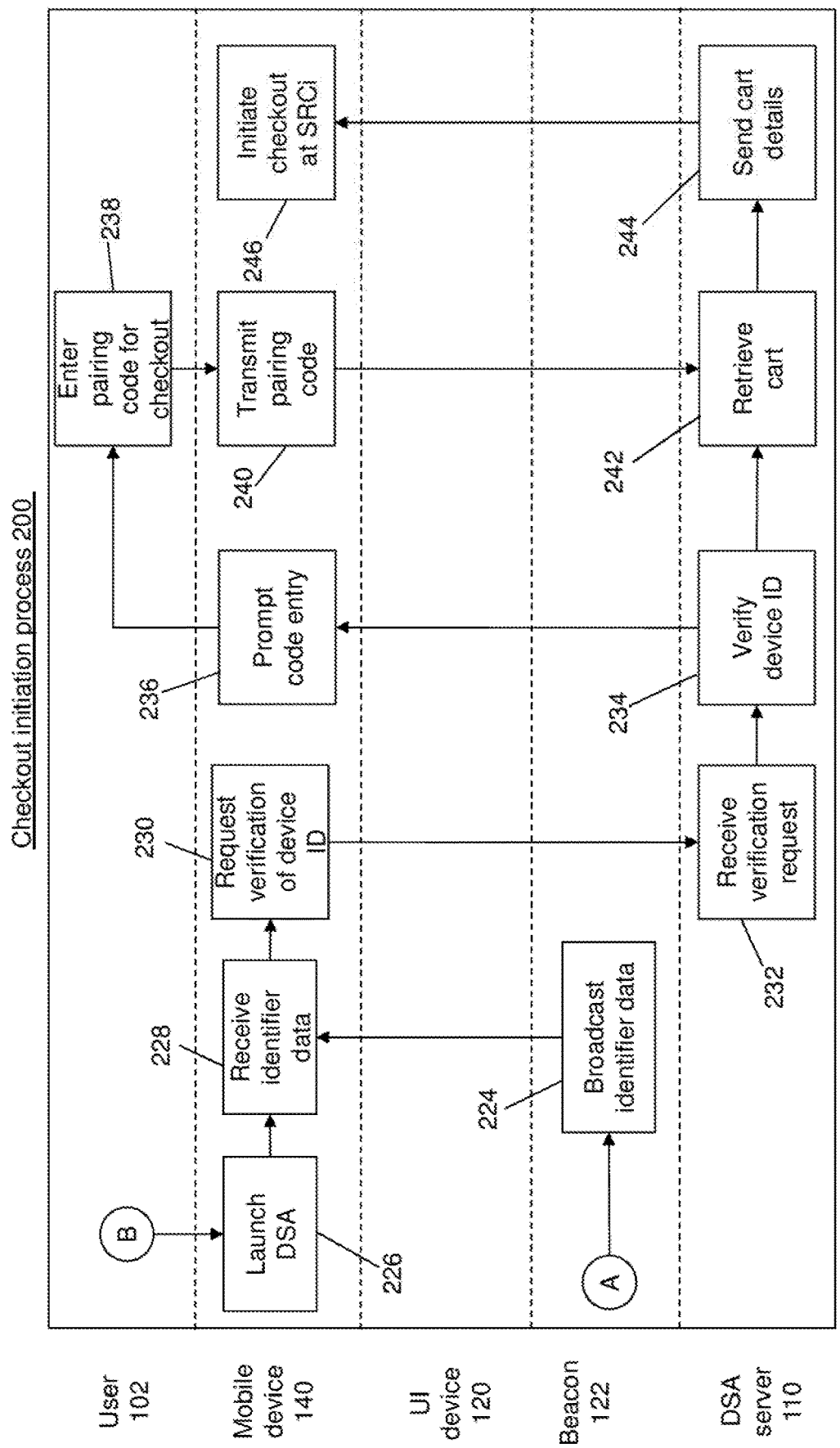

Turning now to FIG. 2, a method 200 for secure guest checkout includes a step 202 of user 102 interacting with the untrusted device 120 to request a selection of one or more items to be added to a shopping cart, for example by issuing a voice command or by entering the selection via a touch screen or other input device of the untrusted device 120. The untrusted device 120 receives the user selection(s) at step 204, for example via UI module 126. Untrusted device 120 may monitor whether a current session established by the user 102 is still active. For example, if the user 102 makes a selection, but then takes no further action for a certain period, the session may time out such that a subsequent user is able to start anew. Untrusted device 120 may generate a session ID, for example.

At step 206, the untrusted device 120 sends a request (for example, via order module 124) to application server 110 to add the user selection(s) to a shopping cart. The request contains one or more item identifiers for the user selection(s), the unique device identifier of the untrusted device 120, and an identifier which identifies a digital shopping application (DSA) 518 installed on the user's mobile device 140. Item identifiers may be retrieved, for example periodically, by the untrusted device 120 from the application server 110.

Untrusted device 120 monitors (step 208) whether a checkout command has been received from user 102. If not, untrusted device 120 continues to receive user selection(s) at block 206, using UI module 126 and order module 124 for example.

Meanwhile, application server 110 may determine, at step 210, whether there is an existing cart, and if so, it adds the user selection(s) to the existing cart at step 212. If no cart exists for the unique device identifier included in the request, application server 110 creates a cart having a cart identifier, at step 214, and adds the user selection(s) to the created cart. Application server 110 also generates a pairing code, at step 216. The pairing code may be stored, in association with the cart identifier, in a database 616 (FIG. 6) that is part of, or in communication with, application server 110. User selection(s) that have been added to the cart may also be stored in database 616 in association with the cart identifier.

At step 218, application server 110 sends the generated pairing code to untrusted device 120. The pairing code is received by, for example, the order module 124 of the untrusted device 120 (step 220), which may still be processing requests by user 102 to add items to the cart.

If the untrusted device 120 detects, at block 208, a checkout command from the user 102, processing proceeds to block 222, where the untrusted device 120 communicates the pairing code from the application server 110 to the user 102. For example, the pairing code may be displayed on a display of the untrusted device 120. Alternatively, or in addition, the pairing code may be audibly announced by the untrusted device 120. At the same time, the untrusted device 120 prompts the user 102 to launch a digital shopping application (DSA) to complete the checkout process. At the same time, the untrusted device 120 may also start to broadcast identifier data including the unique device identifier, and/or data derived therefrom, via beacon 122 (step 224). In some embodiments, the untrusted device 120 may, when detecting user checkout at block 208, also notify the application server 110. The application server 110 may send a response to the untrusted device 120 to tell the untrusted device 120 to start broadcasting the identifier data. In other embodiments, the untrusted device 120 may be consistently broadcasting the identifier data (for example, at regular intervals, such as once every few seconds).

The broadcasting of the device identifier ensures that it is discoverable by other devices, such as mobile device 140. For example, the beacon 122 may broadcast the identifier data via Bluetooth, or Bluetooth Low Energy (BLE), such that Bluetooth-enabled devices can receive the identifier data. BLE may be advantageous in that it is shorter range than standard Bluetooth, and thus only devices that are in relatively close proximity to the beacon 122—such as the user's mobile device 140—will detect the broadcast signal. This may be useful for avoiding confusion when several untrusted devices 120 are located near each other in a merchant premises.

The identifier data may be, or may include, an encrypted form of the unique device identifier. For example, the unique device identifier may be encrypted using a private key of the untrusted device 120, the private key also being known to the application server 110 such that the application server 110 can decrypt the encrypted unique device identifier for verification purposes. In one example, the private key may be a single (master) key that is shared across all untrusted devices 120 that are managed by application server 110. Alternatively, application server 110 may store a lookup table that maps encrypted device identifiers to corresponding private keys.

In another example, the unique device identifier may be encrypted with the private key, and the identifier data may include the encrypted device identifier and a corresponding public key that is derived from the private key. The application server 110, on receipt of the identifier data, may then decrypt the encrypted device identifier using the public key.

In a further example, the untrusted device 120 may generate a hash of the unique device identifier using a hash function which is also known to the application server 110. The identifier data may then include both the unique device identifier, and the hash, such that the application server 110 can validate the hash using the hash function that is known to both the untrusted device 120 and the application server 110.

Figure 5:
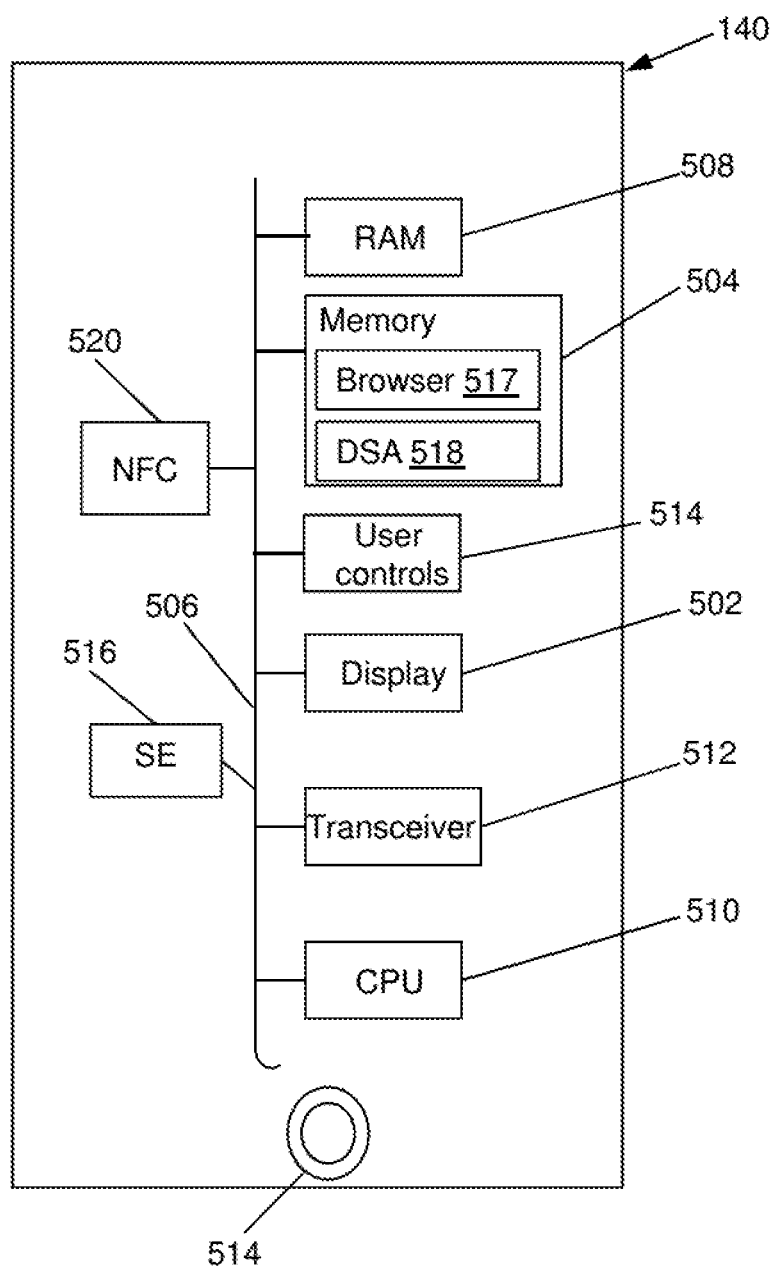
FIG. 5 is an example architecture of a mobile computing device usable with certain embodiments.

To complete the checkout process, user 102, in response to the prompt communicated by the untrusted device 120, launches (step 226) a digital shopping application (DSA) on mobile device 140, such as DSA 518 (FIG. 5). The DSA 518 may be an application of the merchant that operates untrusted device 120, or may be provided by a marketplace or other service provider. The DSA 518 may integrate an SRC mark on a checkout or payment page that enables user 102 to initiate the checkout process.

In some embodiments, an SRC mark may be a graphical user interface element, such as a button or an image associated with or embedding a hyperlink, that may be interacted with by a user to trigger a service request, such as a request to initiate a checkout process. The SRC mark may carry indicia (such as one or more logos and/or text) that indicate one or more entities, such as SRC initiator 150, Digital Card Facilitator 160, SRC system 170 and/or payment system 180, that will be used to process the service request. For example, different SRC marks may represent different digital wallet operators, and the user may select the SRC mark that corresponds to their digital wallet operator of choice. In other embodiments, the SRC mark may simply be indicia that indicate to a user of a merchant site that SRC checkout is available at the merchant site.

Once the DSA 518 has been launched, it is able to capture the identifier data broadcast by beacon 122 and received by mobile device 140 (step 228). To this end, the identifier data may have a DSA-specific format. For example, the identifier data may include header information that identifies it as DSA-related data, such that DSA 518 can automatically recognise and parse the identifier data.

Once the identifier data is received by mobile device 140, the DSA 518 may transmit, to application server 110, a request to verify the unique device identifier. The request may include the identifier data.

The application server 110 receives the identifier data at step 232, and performs a verification process at step 234. If the identifier data includes an encrypted device identifier, the application server 110 may decrypt the encrypted device identifier, and verify that the decrypted device identifier is registered in database 616. If the identifier data includes the device identifier and a hash of the device identifier, the application server 110 may use the appropriate hash function to generate a candidate hash from the device identifier, and check that the candidate hash matches the received hash.

The application server 110 may also confirm that the device identifier is registered in database 616.

If the device identifier is successfully verified at step 234, the application server 110 transmits a confirmation to mobile device 140, which causes mobile device 140 to display (step 236) a prompt for the user 102 to enter a pairing code to retrieve the previously generated shopping cart.

After the user 102 enters (step 238) the pairing code previously communicated by untrusted device 120, the mobile device 140, via DSA 518, transmits (step 240) the entered pairing code to the application server 110. At step 242, the application server 242 retrieves, based on the received pairing code, the shopping cart from database 616. At step 244, the application server 110 transmits cart details to mobile device 140. The cart details may include a list of the items selected by the user for checkout, and a total cost of the selected items. At step 246, the mobile device 140 may (on confirmation by user 102) initiate an SRC checkout process at SRC initiator (SRCi) 150.

Figure 3:
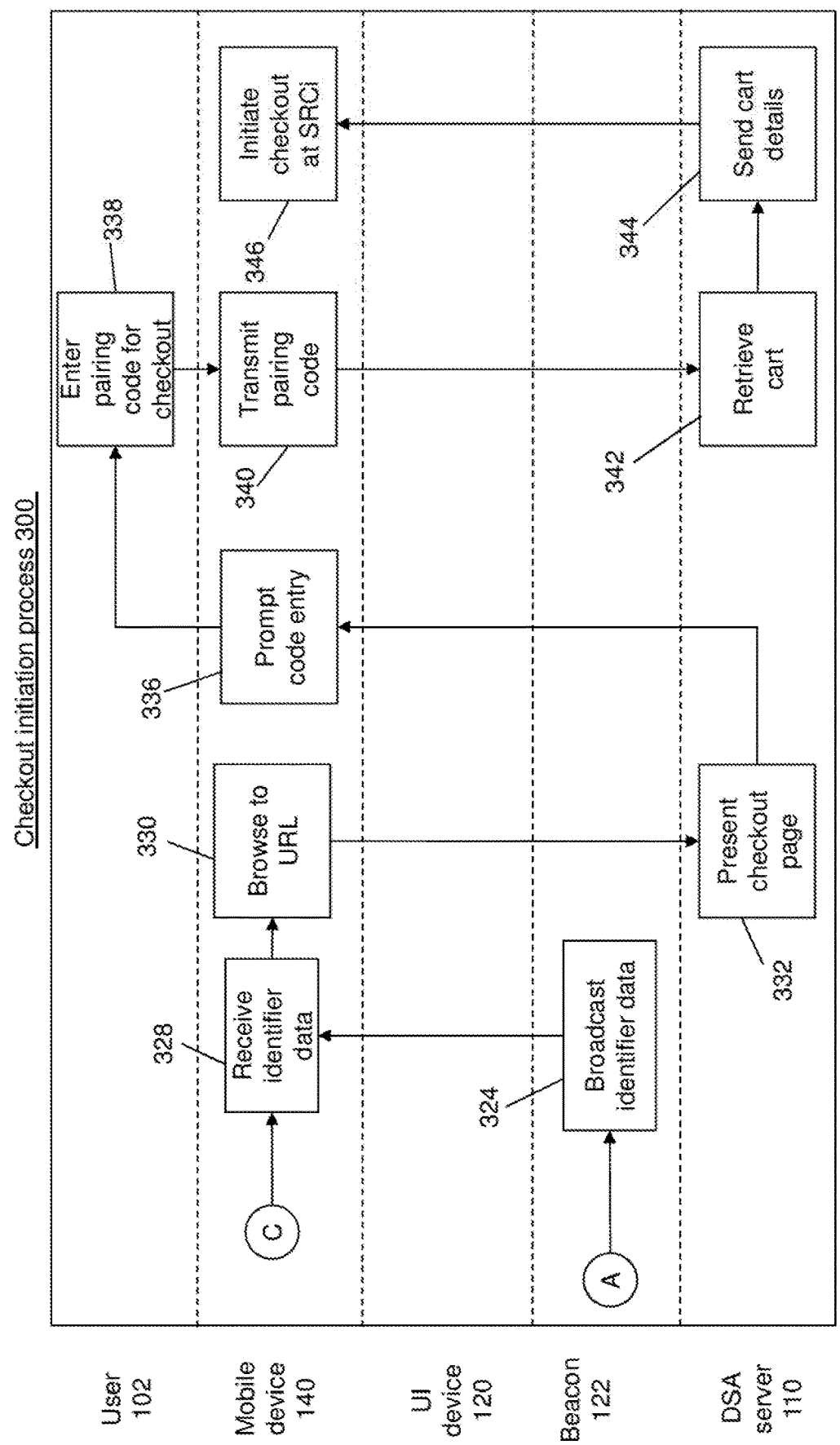
FIG. 3 is a flow diagram showing steps in another example of a secure checkout initiation process.

An alternative embodiment of a checkout initiation process 300 will now be described with reference to FIG. 3. Checkout initiation process 300 may be identical to checkout initiation process 200 up until block 222 of FIG. 2, at which point, instead of prompting user 102 to launch DSA 518, beacon 122 of untrusted device 120 broadcasts (step 324) identifier data that includes a URL of the application server 110 that embeds the unique device identifier. Mobile device 140 listens for the identifier data 328, and once this is received, extracts the URL and automatically browses (or prompts user 102 to browse) to the URL via browser application 517, at block 330. To this end, the identifier data may be broadcast by the beacon 122 using Eddystone or a similar open beacon format.

Browser 517 executing on mobile device 140 may be used to load a checkout page served by application server 110 at block 332, which prompts the user 102 to enter the pairing code at block 336. Entry of the pairing code at block 338 by the user, and subsequent transmission of the pairing code (via browser 517) causes the cart to be unlocked for checkout, at block 342. The cart details are transmitted by application server 110 to mobile device 140, which may (on confirmation by user 102) initiate an SRC checkout process at SRC initiator (SRCi) 150, as before.

Accordingly, the checkout process is made simpler and more efficient, as there is no need for the user 102 to invoke, or even install, the DSA app 518, or for a separate device ID verification step to be performed. Instead, a standard web browser application 517 may be used in checkout initiation process 300. By embedding the unique device identifier in the URL, it is possible for the unique device identifier to be verified simply by the browser 517 accessing the URL, since an invalid device identifier will result in an error (e.g., a HTTP 404 error).

Figure 4:
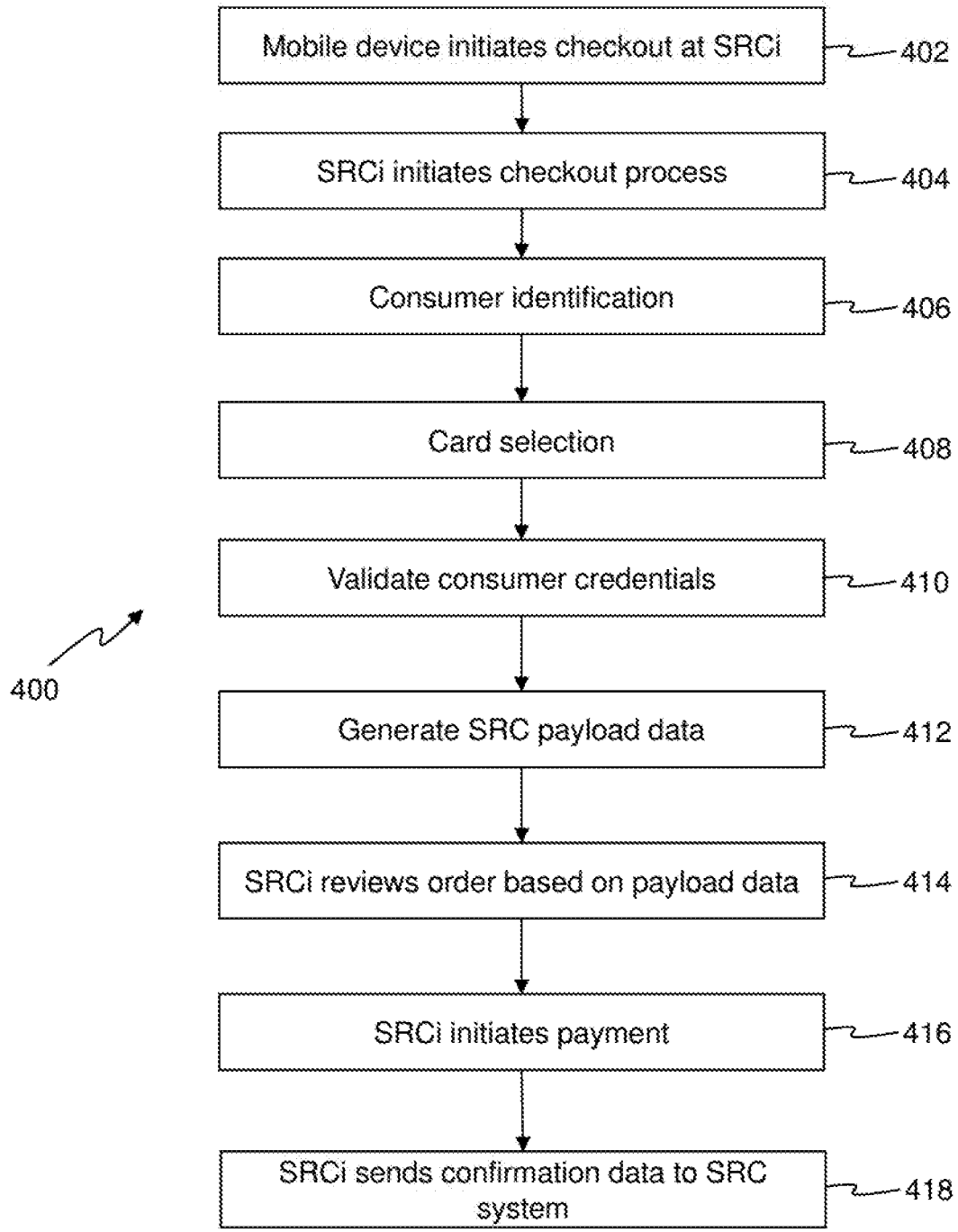
FIG. 4 is a flow diagram showing steps in an example secure remote commerce (SRC) checkout process.

Turning to FIG. 4, an exemplary SRC checkout process 400 enabled by process 200 is shown.

At step 402, the mobile device 140 transmits a request to the SRCi 150 to initiate a SRC checkout process, for example via DSA 518 or web browser 517. The request may include information that is needed by SRCi 150 to identify a consumer profile of user 102 and generate SRC Checkout data, including user-specific data such as an email address or phone number associated with mobile device 140, and profile data such as DSA information (e.g. name and logo of the DSA).

SRCi 150 initiates the checkout process at step 404 by transmitting, to the SRC system 170, the SRC Checkout data. The SRC system 170 identifies, at step 406, the Consumer Device used and the Consumer to enable Card Selection. The SRC system 170 also identifies the DCF 160 to which SRC Checkout data should be sent to enable the Card Selection step 408.

In the Card Selection step 308, the identification of the DCF 160 is returned to SRCi 150. The SRCi 150 then retrieves, from DCF 160, the wallet corresponding to the consumer profile, and sends a list of cards of the wallet to the mobile device 140. The list of cards may include the last 4 digits of the PAN (or a tokenised PAN) of each card, for example. User 102 selects, from the list of cards at mobile device 140, a card to be used for payment (or in some embodiments, may add a new card), and the selection is transmitted back to SRCi 150.

SRCi 150 then transmits the card selection to SRC system 170, which determines an issuer of the selected card, and transmits (step 410) a request to the issuer to validate the user 102 credentials to access Digital Card data of the selected card or to allow Digital Card usage of the selected card for purchase. The issuer, acting as DCF 160, provides access to the Digital Card data. The checkout request data (with optional enhancement by SRC system 170) is forwarded to the issuer for authorisation. The user profile of user 102 at the SRC system 170 may be linked to the user 102 credentials at the issuer via the card PAN, for example. If the user 102 credentials are successfully validated, the issuer sends a confirmation message back to the SRC system 170.

Optionally, the issuer may implement a further authentication process to verify that the user 102 making a purchase is entitled to use the selected payment card during a transaction. For example, the issuer may initiate a 3-D Secure verification process by transmitting, to mobile device 140, a one-time password. The issuer may also transmit a 3-D Secure verification URL to SRC system 170, which in turn transmits the 3-D Secure verification URL to SRCi 150, to cause the browser 517 of mobile device 140 to display a verification page for input of the one-time password. The password entered at mobile device 140 is transmitted to SRCi 150, and in turn to SRC system 170 for forwarding to the issuer. If the entered password matches the password transmitted by the issuer, the issuer sends a confirmation message back to the SRC system 170.

Once the SRC system 170 receives the confirmation message, it generates, at step 412, SRC Payload data, that it sends securely to SRCi 150. The SRC Payload data enables authorisation and other payment functions to be performed. In particular, the SRC Payload data may include the following:

consumer-specific data such as email and mobile number;
details about the Consumer-selected Payment Card;
a Consumer-selected shipping address;
details about performed services such as 3-D Secure, Payment Tokenisation, and value added services;
Digital Card Facilitator details such as name and logo;
Consumer verification response data;
details about the Consumer Device;
details about the transaction such as amount and currency; and
risk information about the Consumer and transaction.

At step 414, the SRCi 150 uses the SRC Payload data to review the order.

At step 416, the SRCi 150 completes the order by initiating an authorisation request at payment system 180. For example, the SRCi 150 may use the details of the user-selected payment card to transmit an authorisation request to a payment network of the payment system 180.

The payment network may, in turn, transmit the authorisation request to the issuer of the user-selected payment card for approval, in known fashion.

Once the authorisation request has been approved, the SRC Initiator 150 sends SRC Confirmation data to the SRC System 170, at step 418, the SRC Confirmation data indicating that a payment has been performed. The SRC System 170 receives the SRC Confirmation data, and may transmit a notification to the SRCi 150 that the payment has been completed. The SRCi 150 may then transmit a notification to the DSA 518 executing on mobile device 140.

Further details of certain computing devices of the system 10 will now be described.

Mobile Device 140

FIG. 5 is a block diagram showing an exemplary computing device 140. The device 140 may be a mobile computer device such as a smart phone, a tablet, a personal data assistant (PDA), a palm-top computer, and multimedia Internet enabled cellular telephones. For ease of description, the mobile computer device 140 is described below, by way of non-limiting example, with reference to a mobile device in the form of a smart phone.

As shown, the mobile computer device 140 includes the following components in electronic communication via a bus 506:

(a) a display 502;
(b) non-volatile (non-transitory) memory 504;
(c) random access memory ("RAM") 508;
(d) N processing components 510;
(e) a transceiver component 512 that includes N transceivers;
(f) user controls 514;
(g) a secure element 516; and
(h) a NFC controller 520.

Although the components depicted in FIG. 5 represent physical components, FIG. 5 is not intended to be a hardware diagram. Thus, many of the components depicted in FIG. 5 may be realised by common constructs or distributed among additional physical components. Moreover, it is certainly contemplated that other existing and yet-to-be developed physical components and architectures may be utilised to implement the functional components described with reference to FIG. 5.

The display 502 generally operates to provide a presentation of content to a user, and may be realised by any of a variety of displays (e.g., CRT, LCD, HDMI, micro-projector and OLED displays).

In general, the non-volatile data storage 504 (also referred to as non-volatile memory) functions to store (e.g., persistently store) data and executable code.

In some embodiments for example, the non-volatile memory 504 includes bootloader code, modem software, operating system code, file system code, and code to facilitate the implementation components, known to those of ordinary skill in the art, which are not depicted nor described for simplicity. For example, the non-volatile memory 504 may contain a web browser 517 and a digital shopping application (DSA) 518.

In many implementations, the non-volatile memory 504 is realised by flash memory (e.g., NAND or ONENAND memory), but it is certainly contemplated that other memory types may be utilised as well. Although it may be possible to execute the code from the non-volatile memory 504, the executable code in the non-volatile memory 504 is typically loaded into RAM 508 and executed by one or more of the N processing components 510.

The N processing components 510 in connection with RAM 508 generally operate to execute the instructions stored in non-volatile memory 504. As one of ordinarily skill in the art will appreciate, the N processing components 510 may include a video processor, modem processor, DSP, graphics processing unit (GPU), and other processing components.

The transceiver component 512 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS network), and other types of communication networks.

The mobile computer device 140 can execute mobile applications, such as a digital shopping application (DSA) 518. The DSA 518 could be a mobile application, web page application, or computer application. The DSA 518 may be accessed by a computing device such as mobile computer device 140, or a wearable device such as a smartwatch.

It should be recognised that FIG. 5 is merely exemplary and in one or more exemplary embodiments, the functions described herein may be implemented in hardware, software, firmware, or any combination thereof. If implemented in software, the functions may be transmitted or stored as one or more instructions or code encoded on a non-transitory computer-readable medium 504. Non-transitory computer-readable medium 504 includes both computer storage medium and communication medium including any medium that facilitates transfer of a computer program from one place to another. A storage medium may be any available medium that can be accessed by a computer.

Application Server 110

Figure 6:
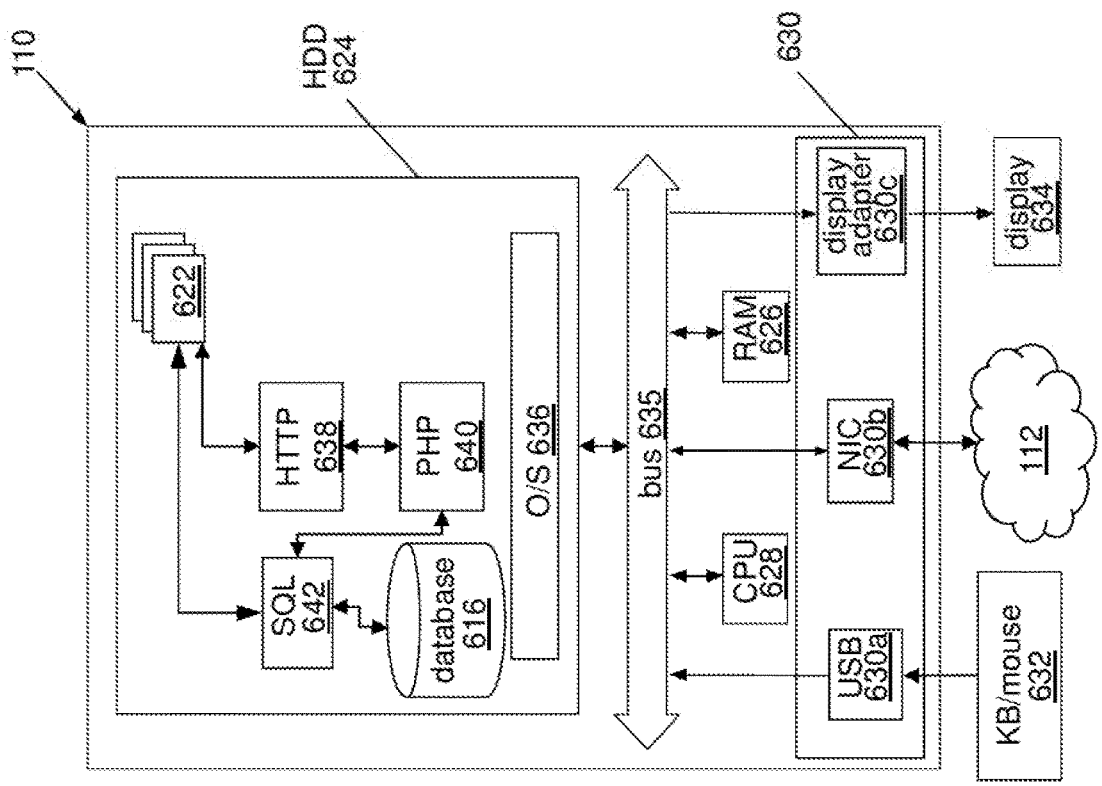
FIG. 6 is an example architecture of a digital shopping application (DSA) server according to certain embodiments.

FIG. 6 shows an example computing device 110 that is capable of implementing an application server of the system 100. In some embodiments, multiple computing devices 110 may be considered to be a single application server.

The components of the computing device 110 can be configured in a variety of ways. The components can be implemented entirely by software to be executed on standard computer server hardware, which may comprise one hardware unit or different computer hardware units distributed over various locations, which may communicate over a network. Some of the components or parts thereof may also be implemented by application specific integrated circuits (ASICs) or field programmable gate arrays.

In the example shown in FIG. 6, the computing device 110 is a commercially available server computer system based on a 32 bit or a 64 bit Intel architecture, and the processes and/or methods executed or performed by the computing device 110 are implemented in the form of programming instructions of one or more software components or modules 622 stored on non-volatile (e.g., hard disk) computer-readable storage 624 associated with the computing device 110. At least parts of the software modules 622 could alternatively be implemented as one or more dedicated hardware components, such as application-specific integrated circuits (ASICs) and/or field programmable gate arrays (FPGAs).

The computing device 110 includes at least one or more of the following standard, commercially available, computer components, all interconnected by a bus 635:
(a) random access memory (RAM) 626;
(b) at least one computer processor 628, and
(c) external computer interfaces 630:
  (i) universal serial bus (USB) interfaces 630a (at least one of which is connected to one or more user-interface devices, such as a keyboard, a pointing device (e.g., a mouse 632 or touchpad),
  (ii) a network interface connector (NIC) 630b which connects the computer device 110 to a data communications network and/or to external devices; and
  (iii) a display adapter 630c, which is connected to a display device 634 such as a liquid-crystal display (LCD) panel device.

The computing device 110 includes a plurality of standard software modules, including:
(a) an operating system (OS) 636 (e.g., Linux or Microsoft Windows);
(b) web server software 638 such as Apache, available at http://www.apache.org;
(c) scripting language support 640 such as PHP, available at http://www.php.net, or Microsoft ASP; and
(d) structured query language (SQL) modules 642 (e.g., MySQL, available from http://www.mysql.com), which allow data to be stored in and retrieved/accessed from an SQL database 616.

Together, the web server 638, scripting language module 640, and SQL module 642 provide the application server 110 with the general ability to allow users of the Internet 112 with standard computing devices equipped with standard web browser software to access the application server 110 and in particular to provide data to and receive data from the database 616.

However, it will be understood by those skilled in the art that the specific functionality provided by the application server 110 to such users is provided by scripts accessible by the web server 638, including the one or more software modules 622 implementing the processes, and also any other supporting scripts and data (not shown), including markup language (e.g., HTML, XML) scripts, PHP (or ASP), and/or CGI scripts, image files, style sheets, and the like.

Advantageously, the database 616 forms part of the computer readable data storage 624. Alternatively, the database 616 is located remote from the server 110 shown in FIG. 6.

The boundaries between the modules and components in the software modules 622 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the processes 200, 300 and 400 performed by the application server 110 may be executed by a module (of software modules 622) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computing device 110 normally processes information according to a program (a list of internally stored instructions such as a particular application program and/or an operating system) and produces resultant output information via input/output (I/O) devices 630. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Digital Card Facilitator 160

Digital Card Facilitator 160 provides users 102 with access to Digital Card data through Card Selection and other SRC functions during a purchase experience by interacting and integrating with one or more SRC System(s) 170.

The Digital Card Facilitator 160 stores or accesses Digital Card instances of primary account numbers (PANs) of users 102. The data stored by Digital Card Facilitator 160 to support an SRC Experience includes:
  A Payment Token or PAN Reference
  A visual representation of the Payment Card
  User identity The data stored may include Consumer Device information.

The functions enabled by Digital Card Facilitator 160 may include, but are not limited to:
  On-boarding and integration with one or more SRC System(s) 170
  Secure distribution of payment related data to the SRC System Enrolment of Digital Card credentials established by the Card Issuer
  Identification of Consumer 102 and Consumer Device 140 to facilitate access to Cardholder data
  Verification of the relationship between the Consumer 102 and Consumer Device 140 and providing related results
  Facilitation of the procurement of Consumer Payment Data
  Secure exchange of data with the SRC System 170
  Proper and secure storage and maintenance of Digital Card, Consumer Personal Account Information (PAI) and Personally Identifiable Information (PII) data
  Secure distribution of value added service related data
  Support of required SRC ecosystem interactions and interfaces Digital Card Facilitator enablement may include either inline access directly to Card Issuer systems or maintenance of a container known as a digital wallet that stores data outside of a Card Issuer system and is accessed through an established credential.

A Digital Card Facilitator 160 may be, for example, a payment network (such as Mastercard), a browser, an issuer, or a merchant.

SRC Initiator 150

SRC Initiator 150 integrates an SRC Mark on a checkout or payment page of a Digital Shopping Application 518 to enable an SRC Experience resulting in SRC Payload data. SRC Initiators may have their own Digital Shopping Application 518 or may have a relationship with one or more Digital Shopping Application providers. SRC Initiator 150 may interact and interface with one or more SRC System(s) 170.

Responsibilities of the SRC Initiator 150 may include, but are not limited to:

On-boarding and integrating with one or more SRC System(s) 170 and their common interfaces Receiving credentials from each SRC System 170 to securely exchange data Rendering SRC Mark(s)

Securely providing SRC Checkout data to SRC Systems 170

Securely receiving SRC Payload data from SRC Systems 170 to facilitate transaction processing in accordance with established SRC Programme, Payment System and Payment Network transaction processing requirements using their existing payment processor and acquiring provider Providing Consumer Confirmation to SRC Systems 170

Indicating value added services requested to the SRC System 170 which may include Payment Tokenisation and 3-D Secure authentication Entities which provide payment services on behalf of merchants can be SRC Initiators 150 in their own right. Such entities indicate which merchant they are servicing by providing the appropriate profile data.

An SRC Initiator 150 may be, for example, a merchant, an acquirer, a payment gateway, or a payment service provider (PSP).

It will be appreciated that many further modifications and permutations of various aspects of the described embodiments are possible. Accordingly, the described aspects are intended to embrace all such alterations, modifications, and variations that fall within the spirit and scope of the appended claims. For example, while embodiments of the present invention are described throughout this specification in connection with SRC, these embodiments are not limited only to SRC but may also be implemented on other payment platforms that have a similar operation or functionality.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A system for initiating secure guest checkout of an untrusted device, including:
    an application server; and
    an untrusted user interaction device comprising a beacon device configured to wirelessly broadcast data, wherein the untrusted interaction device is in communication with the application server;
    wherein the untrusted user interaction device at least one of lacks a mechanism for a user to securely validate credentials to the application server and does not securely store data relating to the user or to selections made by the user, and wherein the untrusted user interaction device has a unique device identifier that is registered with the application server, and is configured to:
    receive input data via a user interface module from a user relating to a selection of one or more items;
    transmit, via an order module to the application server, a digital shopping application (DSA) identifier which identifies a DSA installed on a mobile device of the user, the selection of one or more items and the unique device identifier, for creation of a cart at the application server;
    receive, by the order module from the application server, a pairing code;
    detect a checkout command from the user;
    communicate, in response to the checkout command, the pairing code received from the application server to the user, the pairing code being associated with the cart;
    prompt the user to launch the DSA on the user mobile device to complete the checkout process; and
    wirelessly broadcast, at regular intervals via the beacon device, identifier data including, and/or derived from, the unique device identifier which is discoverable by the user mobile device;
    wherein a computing device receives the broadcast identifier data and the pairing code, verifies the unique device identifier, transmits a confirmation to the user mobile device, and after receiving the pairing code from the user mobile device retrieves the cart for initiation of a secure remote commerce (SRC) checkout process at an SRC initiator.

2. A system according to claim 1, wherein the identifier data includes an encrypted form of the unique device identifier.

3. A system according to claim 1, wherein the identifier data includes a URL that embeds the unique device identifier, such that the computing device can verify the unique device identifier by accessing the URL with a browser application.

4. A system according to claim 1, wherein the untrusted user interaction device is a smart speaker, a digital kiosk or a self-service terminal.

5. A system according to claim 1, wherein the untrusted user interaction device is configured to broadcast the identifier data by Bluetooth Low Energy (BLE).

6. A system according to claim 1, wherein the untrusted user interaction device includes, or is in communication with, a beacon device that is configured to broadcast the identifier data.

7. A system according to claim 6, wherein the beacon device is connected to a physical or logical port of the user interaction device.

8. An untrusted user interaction device for secure guest checkout, the untrusted user interaction device being in communication with an application server and having a unique device identifier that is registered with the application server, wherein the untrusted user interaction device at least one of lacks a mechanism for a user to securely validate credentials to the application server and does not securely store data relating to the user or to selections made by the user, the untrusted user interaction device including:

at least one processor;

non-volatile computer readable storage in communication with the at least one processor;

an order module in communication with the at least one processor;

a user interface (UI) module in communication with the at least one processor; and a beacon device in communication with the at least one processor, wherein the beacon device is configured to wirelessly broadcast data;

wherein the non-volatile computer readable storage has stored thereon instructions for causing the at least one processor to:

receive input data via the UI module from a user relating to a selection of one or more items;

transmit, via the order module to the application server, a digital shopping application (DSA) identifier which identifies a DSA installed on a mobile device of the user, the selection of one or more items and the unique device identifier, for creation of a cart at the application server;

receive, by the order module from the application server, a pairing code;

detect a checkout command from the user;

communicate, in response to the checkout command, the pairing code received from the application server to the user, the pairing code being associated with the cart;

prompt the user to launch the DSA to complete the checkout process; and wirelessly broadcast, via the beacon device at regular intervals, identifier data including, and/or derived from, the unique device identifier which is discoverable by a user mobile device;

wherein a computing device receives the broadcast identifier data and the pairing code, verifies the unique device identifier, transmits a confirmation to the user mobile device, and after receiving the pairing code from the user mobile device retrieves the cart for initiation of a secure remote commerce (SRC) checkout process at an SRC initiator.

9. An untrusted user interaction device according to claim 8, wherein the identifier data includes an encrypted form of the unique device identifier.

10. An untrusted user interaction device according to claim 8, wherein the identifier data includes a URL that embeds the unique device identifier, such that the computing device can verify the unique device identifier by accessing the URL with a browser application.

11. An untrusted user interaction device according to claim 8, wherein the untrusted user interaction device is a smart speaker, a digital kiosk or a self-service terminal.

12. An untrusted user interaction device according to claim 8, wherein the beacon device is configured to broadcast the identifier data by Bluetooth Low Energy (BLE).

13. One or more non-volatile computer-readable media having stored thereon computer-readable instructions for causing at least one processor to:

receive, from a user via a UI module, input data relating to a selection of one or more items;

transmit, via an order module to an application server, a digital shopping application (DSA) identifier which identifies a DSA installed on a mobile device of the user, and the selection of one or more items and the unique device identifier, for creation of a cart at the application server;

receive, by the order module from the application server, a pairing code;

detect a checkout command from the user;

communicate, in response to the checkout command, the pairing code received from the application server to the user, the pairing code being associated with the cart;

prompt the user to launch the DSA on the user mobile device to complete the checkout process; and wirelessly broadcast via a beacon device identifier data including, and/or derived from, the unique device identifier which is discoverable by the user mobile device;

wherein a computing device receives the broadcast identifier data and the pairing code, verifies the unique device identifier, transmits a confirmation to the user mobile device, and after receiving the pairing code from the user mobile device retrieves the cart for initiation of a secure remote commerce (SRC) checkout process at an SRC initiator.

\* \* \* \* \*